(12) United States Patent
Seo et al.

(10) Patent No.: US 9,136,994 B2
(45) Date of Patent: Sep. 15, 2015

(54) METHOD AND DEVICE FOR TRANSMITTING DATA IN A MULTI ANTENNA WIRELESS COMMUNICATION SYSTEM

(75) Inventors: Hanbyul Seo, Anyang-si (KR); Byounghoon Kim, Anyang-si (KR); Hakseong Kim, Anyang-si (KR); Daewon Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 14/116,211

(22) PCT Filed: Apr. 19, 2012

(86) PCT No.: PCT/KR2012/003004
§ 371 (c)(1),
(2), (4) Date: Nov. 7, 2013

(87) PCT Pub. No.: WO2012/153922
PCT Pub. Date: Nov. 15, 2012

(65) Prior Publication Data
US 2014/0079018 A1    Mar. 20, 2014

Related U.S. Application Data

(60) Provisional application No. 61/485,108, filed on May 11, 2011, provisional application No. 61/485,128, filed on May 12, 2011.

(51) Int. Cl.
*H04L 5/00* (2006.01)
*H04L 27/26* (2006.01)

(52) U.S. Cl.
CPC ............ *H04L 5/0023* (2013.01); *H04L 5/0007* (2013.01); *H04L 5/0048* (2013.01); *H04L 27/2614* (2013.01)

(58) Field of Classification Search
None
See application file for complete search history.

(56) References Cited

U.S. PATENT DOCUMENTS

| 2007/0155431 | A1* | 7/2007 | Munzner et al. ............... 455/560 |
| 2008/0298224 | A1 | 12/2008 | Pi et al. |
| 2011/0064159 | A1 | 3/2011 | Ko et al. |
| 2011/0268072 | A1* | 11/2011 | Lee et al. ....................... 370/329 |
| 2012/0182974 | A1* | 7/2012 | Dai et al. ....................... 370/336 |

FOREIGN PATENT DOCUMENTS

| WO | WO 2010/018977 A2 | 2/2010 |
| WO | WO 2010/101414 A2 | 9/2010 |
| WO | WO 2010/114269 A2 | 10/2010 |

* cited by examiner

*Primary Examiner* — Mohammad Adhami
(74) *Attorney, Agent, or Firm* — Birch, Stewart, Kolasch & Birch, LLP

(57) ABSTRACT

The present invention relates to a method for a transmitter to transmitter data to a receiver in a multi wireless communication system. In more detail, the method include: mapping a transmission resource, which is allocated for the data, into the data the in order of a space domain, a frequency domain, and a time domain; and transmitting the data to the receiver by using the mapped transmission resource. The transmission resource includes a plurality of space resources. Each of the plurality of space resources includes a plurality of resource allocation units, which are defined by a specific time resource and a specific frequency resource. The mapping of the transmission resource includes mapping the plurality of complex symbols into the remaining space resources in the order of a frequency resource and a time resource if there is no resource allocation unit allocated to a specific space resource.

12 Claims, 12 Drawing Sheets

(a) Control-plane protocol stack (b) User-plane protocol stack

FIG. 9

OFDM symbol #0   layer #0  | 0 | 2 | 4 | 6 |
                 layer #1  | 1 | 3 | 5 | 7 | 8 | 9 | 10 | 11 |

OFDM symbol #1   layer #0  | 12 | 14 | 16 | 18 |
                 layer #1  | 13 | 15 | 17 | 19 | 20 | 21 | 22 | 23 |

OFDM symbol #2   layer #0  | 24 | 26 | 28 | 30 | 32 | 34 | 36 | 38 |
                 layer #1  | 25 | 27 | 29 | 31 | 33 | 35 | 37 | 39 |

OFDM symbol #3   layer #0  | 40 | 42 | 44 | 46 | 48 | 50 | 52 | 54 |
                 layer #1  | 41 | 43 | 45 | 47 | 49 | 51 | 53 | 55 |

(a)

OFDM symbol #0   layer #0  | 0 | 3 | 6 | 9 |
                 layer #1  | 1 | 4 | 7 | 10 | 12 | 14 | 16 | 18 |
                 layer #2  | 2 | 5 | 8 | 11 | 13 | 15 | 17 | 19 |

OFDM symbol #1   layer #0  | 20 | 23 | 26 | 29 |
                 layer #1  | 21 | 24 | 27 | 30 | 32 | 34 | 36 | 38 |
                 layer #2  | 22 | 25 | 28 | 31 | 33 | 35 | 37 | 39 |

OFDM symbol #2   layer #0  | 40 | 43 | 46 | 49 | 52 | 55 | 58 | 61 |
                 layer #1  | 41 | 44 | 47 | 50 | 53 | 56 | 59 | 62 |
                 layer #2  | 42 | 45 | 48 | 51 | 54 | 57 | 60 | 63 |

OFDM symbol #3   layer #0  | 64 | 67 | 70 | 73 | 76 | 79 | 82 | 85 |
                 layer #1  | 65 | 68 | 71 | 74 | 77 | 80 | 83 | 86 |
                 layer #2  | 66 | 69 | 72 | 75 | 78 | 81 | 84 | 87 |

| | | | |
|---|---|---|---|
| OFDM symbol #0 | layer #0 | 0 2 4 6 | |
| | layer #1 | 1 3 5 7 9 11 13 15 | |
| OFDM symbol #1 | layer #0 | 8 10 12 14 | |
| | layer #1 | 17 19 21 23 25 27 29 31 | |
| OFDM symbol #2 | layer #0 | 16 18 20 22 24 26 28 30 | |
| | layer #1 | 33 35 37 39 41 43 45 47 | |
| OFDM symbol #3 | layer #0 | 32 34 36 38 40 42 44 46 | |
| | layer #1 | 48 49 50 51 52 53 54 55 | |

(a)

| | | |
|---|---|---|
| OFDM symbol #0 | layer #0 | 0 3 6 9 |
| | layer #1 | 1 4 7 10 13 16 19 22 |
| | layer #2 | 2 5 8 11 14 17 20 23 |
| OFDM symbol #1 | layer #0 | 12 15 18 21 |
| | layer #1 | 25 28 31 34 37 40 43 46 |
| | layer #2 | 26 29 32 35 38 41 44 47 |
| OFDM symbol #2 | layer #0 | 24 27 30 33 36 39 42 25 |
| | layer #1 | 49 52 55 59 62 65 68 71 |
| | layer #2 | 50 53 56 60 63 66 69 72 |
| OFDM symbol #3 | layer #0 | 48 51 54 58 61 64 67 70 |
| | layer #1 | 73 75 77 79 81 83 85 87 |
| | layer #2 | 74 76 78 80 82 84 86 88 |

| | | | | | | | | | | |
|---|---|---|---|---|---|---|---|---|---|---|
| OFDM symbol #0 | layer #0 | 0 | 2 | 4 | 6 | | | | | |
| | layer #1 | 1 | 3 | 5 | 7 | 8 | 10 | 12 | 14 | |

| | | | | | | | | | | |
|---|---|---|---|---|---|---|---|---|---|---|
| OFDM symbol #1 | layer #0 | 9 | 11 | 13 | 15 | | | | | |
| | layer #1 | 16 | 18 | 20 | 22 | 24 | 26 | 28 | 30 | |

| | | | | | | | | | | |
|---|---|---|---|---|---|---|---|---|---|---|
| OFDM symbol #2 | layer #0 | 17 | 19 | 21 | 23 | 32 | 34 | 36 | 38 | |
| | layer #1 | 25 | 27 | 29 | 31 | 40 | 42 | 44 | 46 | |

| | | | | | | | | | | |
|---|---|---|---|---|---|---|---|---|---|---|
| OFDM symbol #3 | layer #0 | 33 | 35 | 37 | 39 | 48 | 49 | 50 | 51 | |
| | layer #1 | 41 | 43 | 45 | 57 | 52 | 53 | 54 | 55 | |

US 9,136,994 B2

METHOD AND DEVICE FOR TRANSMITTING DATA IN A MULTI ANTENNA WIRELESS COMMUNICATION SYSTEM

This application is the National Phase of PCT/KR2012/003004 filed on Apr. 19, 2012, which claims priority under 35 U.S.C. 119(e) to U.S. Provisional Application Nos. 61/485,108 filed on May 11, 2011 and 61/485,128 filed on May 12, 2011, all of which are hereby expressly incorporated by reference into the present application.

TECHNICAL FIELD

The present invention relates to a wireless communication system, and more particularly, to a method for transmitting a data in a multi antenna wireless communication system and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of transmitting a data in a multi antenna wireless communication system and an apparatus therefor in the following description based on the discussion as mentioned in the foregoing description.

Technical Solution

To achieve these and other advantages and in accordance with the purpose of the present invention, as embodied and broadly described, according to one embodiment, a method of transmitting a data, which is transmitted by a transmitting end to a receiving end in a multi antenna wireless communication system includes the steps of mapping a transmission resource allocated for the data to the data in an order of a space domain, a frequency domain, and a time domain and transmitting the data to the receiving end using the mapped transmission resource, wherein the transmission resource includes a plurality of space resources, wherein each of a plurality of the space resources consists of a plurality of resource allocation units defined by a specific time resource and a specific frequency resource, wherein if the resource allocation unit allocated to a specific space resource does not exist, the mapping step includes the step of mapping the data to a remaining space resource in an order of a frequency resource and a time resource.

In this case, the resource allocation unit corresponds to a complex-valued modulation symbol and the data corresponds to one codeword coded in a complex-valued modulation symbol unit. In this case, the method can further include the step of performing a rate matching for the codeword in accordance with the number of the resource allocation unit included in the transmission resource.

Preferably, a plurality of the space resources includes a plurality of layers.

More preferably, the resource allocation unit not existing in the specific space resource corresponds to a transmission resource allocated for a control information.

Meanwhile, to further achieve these and other advantages and in accordance with the purpose of the present invention, according to a different embodiment, a transmission device in a multi antenna wireless communication system includes a processor configured to map a transmission resource allocated for a data to the data in an order of a space domain, a frequency domain, and a time domain and a transmission module configured to transmit the data to a receiving end using the mapped transmission resource, wherein the transmission resource comprises a plurality of space resources, wherein each of a plurality of the space resources consists of a plurality of resource allocation units defined by a specific time resource and a specific frequency resource, wherein if the resource allocation unit allocated to a specific space resource does not exist, the processor is configured to map the data to a remaining space resource in an order of a frequency resource and a time resource.

Advantageous Effects

According to embodiments of the present invention, a transmitting end can more efficiently transmit a data to a receiving end in a multi antenna wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 9 is a diagram of an example for a method of layer mapping according to a first embodiment of the present invention;

FIG. 10 is a diagram of an example for a method of layer mapping according to a second embodiment of the present invention;

FIG. 11 is a diagram of an example for a method of layer mapping according to a third embodiment of the present invention;

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 1:
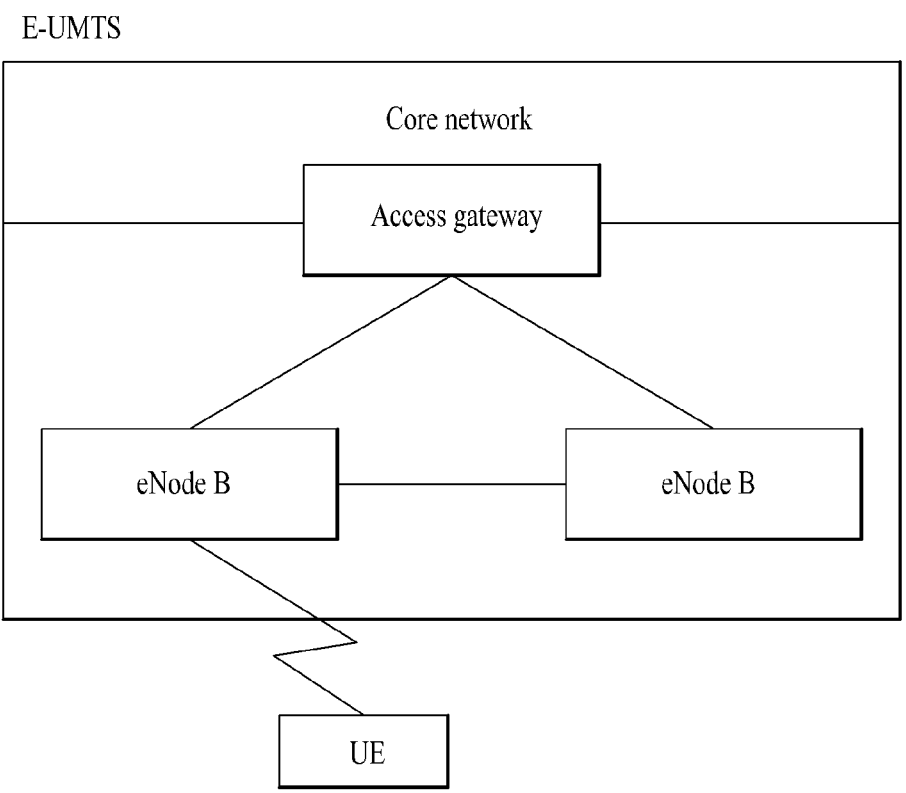
FIG. 1 is a schematic diagram of E-UMTS network structure as one example of a wireless communication system.
Figure 2:
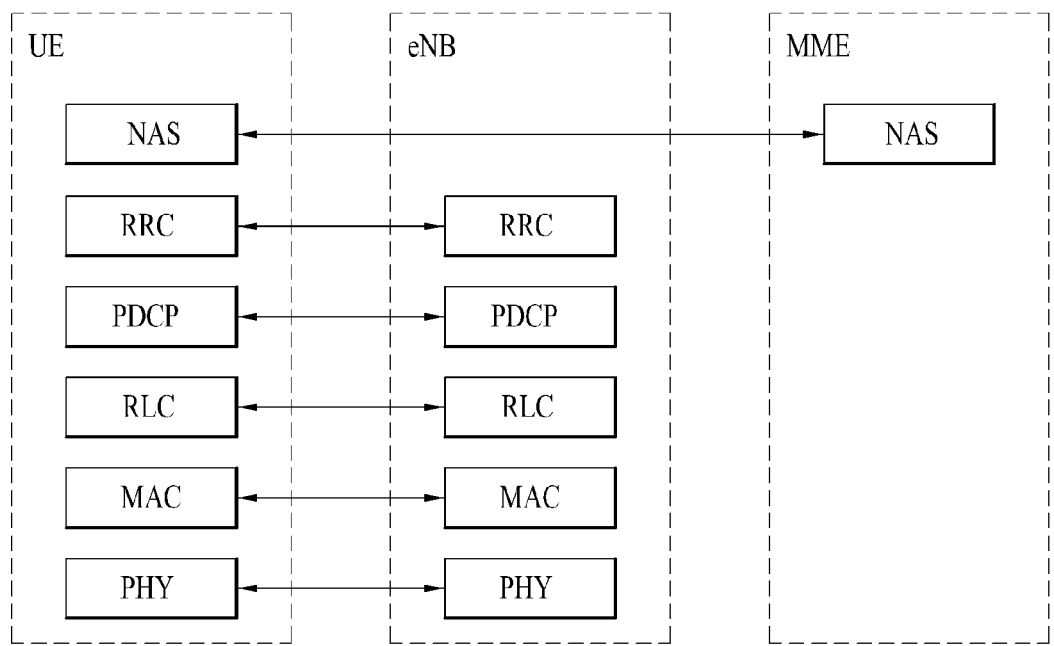
FIG. 2 is a diagram for structures of control and user planes of radio interface protocol between a 3GPP radio access network standard-based user equipment and E-UTRAN.
Figure 2:
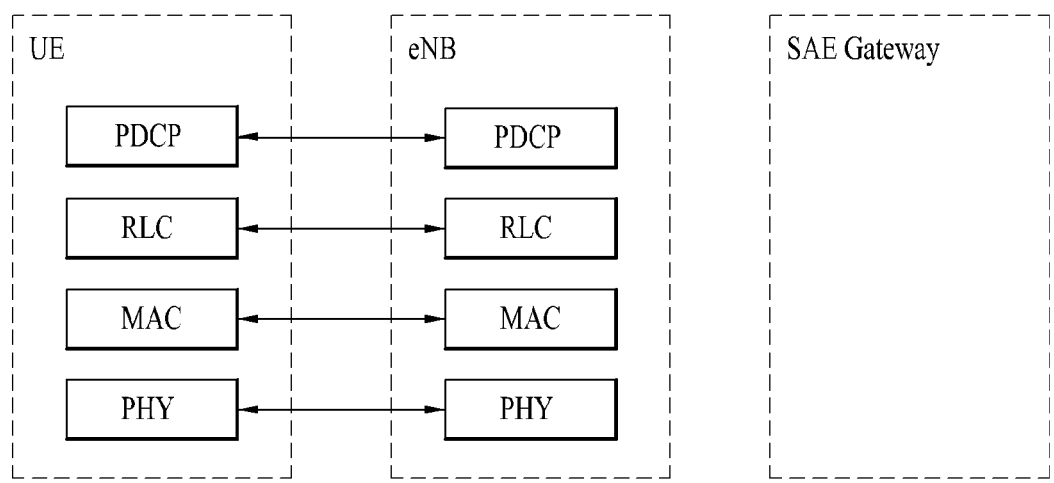

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
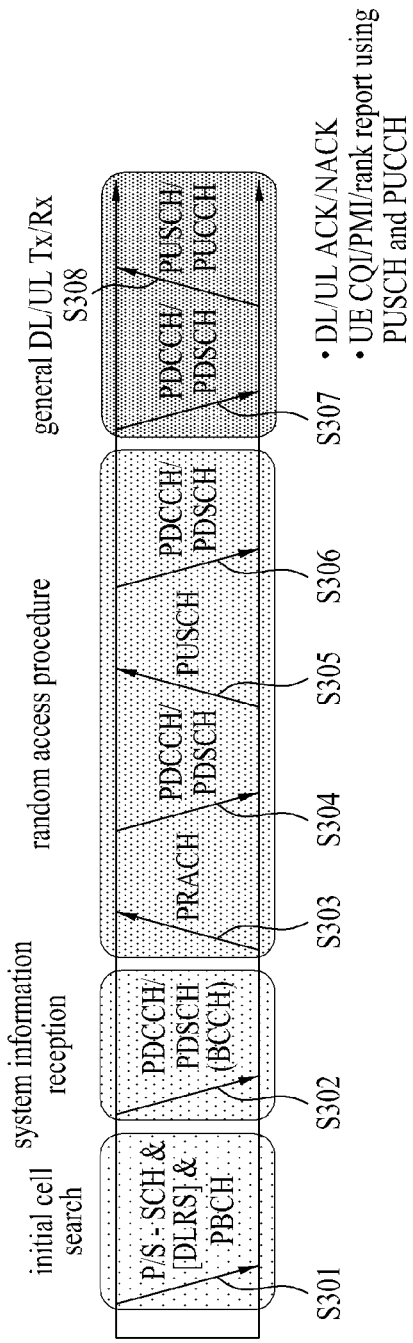
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the base station [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
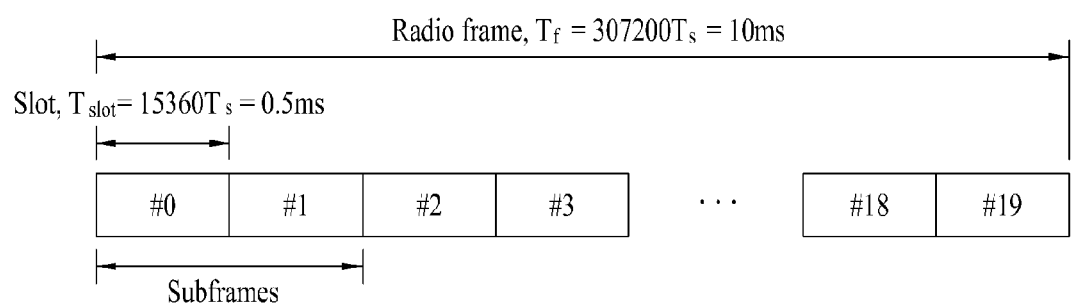
FIG. 4 is a diagram for a structure of a radio frame in LTE system.

FIG. 4 is a diagram for a structure of a radio frame used in an LTE system.

Referring to FIG. 4, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_S$ indicates a sampling time and is represented as $T_S=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
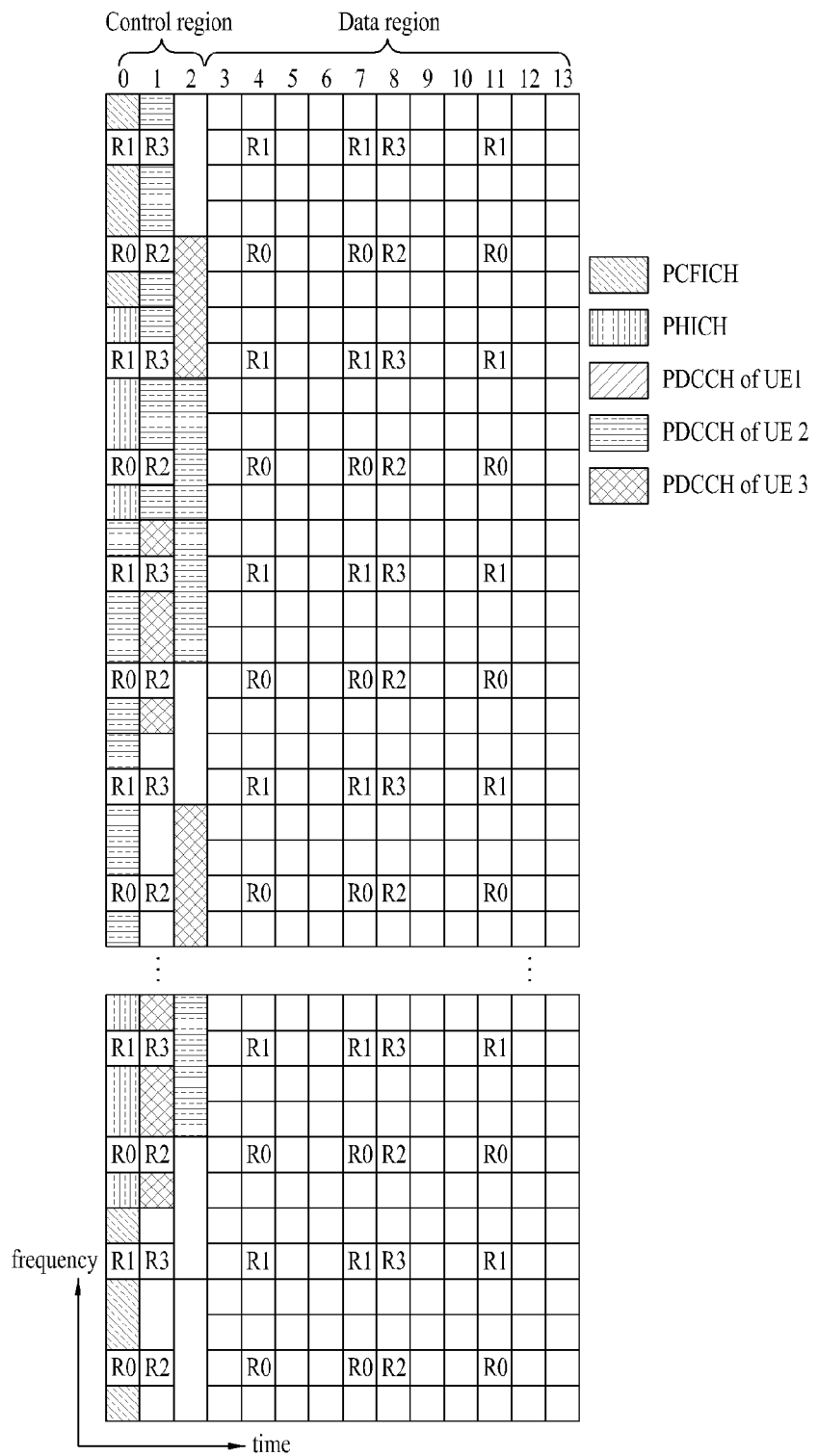
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS or a pilot signal) for an antenna 0 to 3. The RS is fixed as a constant pattern in the subframe irrespective of the control region and the data region. The control channel is allocated to a resource to which the RS is not allocated in the control region and a traffic channel is also allocated to a resource to which the RS is not allocated in the data region. The control channel allocated to the control region may include a physical control format indicator channel (PCFICH), a physical hybrid-ARQ indicator channel (PHICH), a physical downlink control channel (PDCCH) and the like.

The PCFICH is a physical control format indicator channel and informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier*one OFDM symbol'. The value of the PCFICH may indicate the value of 1 to 3 or 2 to 4 according to a bandwidth and is modulated into a QPSK (quadrature phase shift keying).

The PHICH is a physical HARQ (hybrid-automatic repeat and request) indicator channel and used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH is a physical DL control channel and is allocated to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, a base station and the user equipment transmit and receive data via the PDSCH in general except a specific control information or a specific service data.

Information on where the data of the PDSCH is transmitted to which user equipment (one or a plurality of user equipments) and the information on how to receive and decode the PDSCH data by the user equipments and the like are transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transmission block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
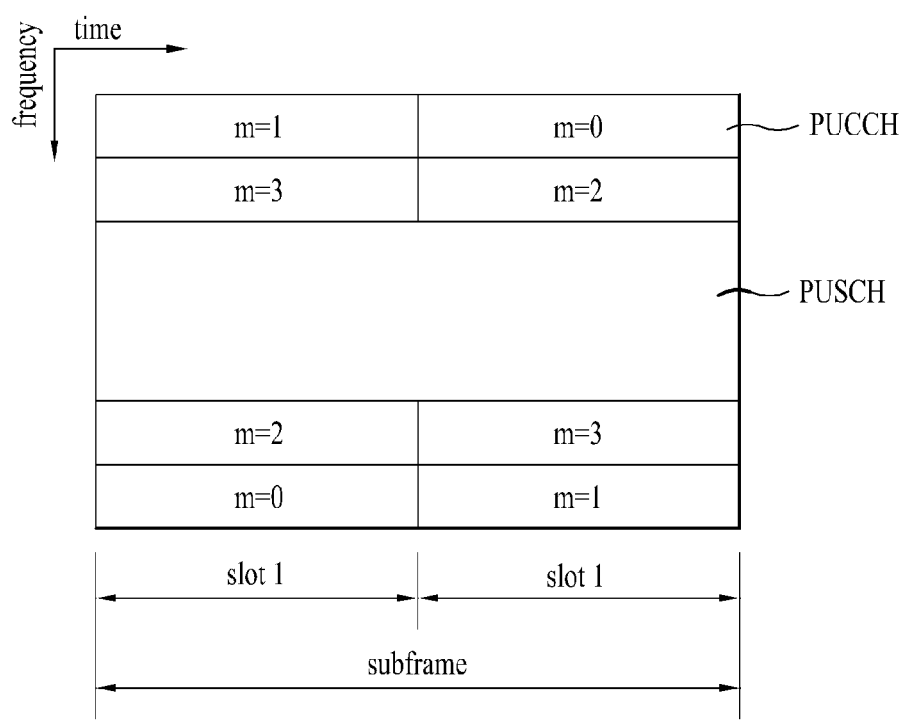
FIG. 6 is a diagram for a structure of an uplink subframe in LTE system.

FIG. 6 is a diagram for a structure of an uplink subframe in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource request, and the like. The PUCCH for a single UE uses one resource block, which occupies different frequencies in each slot within a subframe. In particular, 2 resource blocks assigned to the PUCCH are frequency hopped on a slot boundary. In particular, FIG. 6 shows an example that the PUCCH satisfying conditions (e.g., m=0, 1, 2, 3) is assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi-antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
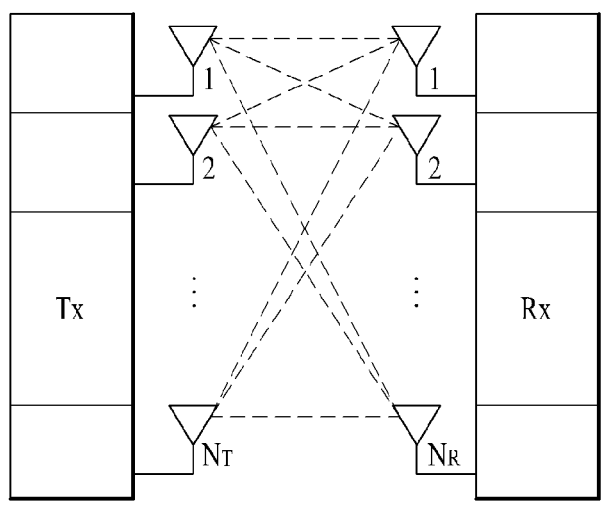
FIG. 7 is a block diagram of a general multi-antenna (MIMO) communication system.

A block diagram of a general multi-antenna communication system is depicted in FIG. 7. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value of the $N_T$ and the $N_R$.

$$R_i = \min(N_T, N_R) \qquad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \qquad \text{[Formula 2]}$$

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector $\hat{s}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The W is called the weighted matrix or a precoding matrix.

$$x = \begin{bmatrix} x_1 \\ x_2 \\ \vdots \\ x_i \\ \vdots \\ x_{N_T} \end{bmatrix} \quad \text{[Formula 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \quad \text{[Formula 6]}$$

And, let's define each of the informations different from each other, which are transmitted using a multi-antenna technology, as a 'transport stream' or simply a 'stream'. The 'stream' can be named a 'layer'. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_R) \quad \text{[Formula 7]}$$

In this case, '# of streams' indicates the number of streams. Meanwhile, in this case, it should be cautious that one stream can be transmitted via more than one antenna.

Various methods may exist to make one or more streams correspond to many antennas. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

In a current LTE system, a data can consist of a plurality of codewords. And, the data consisted of a plurality of the codewords is mapped to a plurality of layers as shown in Table 1. For reference, $d^{(q)}(0), \ldots, d^{(q)}(M_{symb}^{(q)}-1)$ in the following Table 1 indicates a complex-valued modulation symbol of a codeword q.

And, the complex-valued modulation symbol is mapped to such a layer as $x(i) = [x^{(0)}(i) \ldots x^{(\upsilon-1)}(i)]^T$ ($i=0, 1, \ldots, M_{symb}^{layer}-1$). In this case, $\upsilon$ indicates the number of layer and $M_{symb}^{layer}$ indicates the number of modulation symbol per layer. The number of layer $\upsilon$ is equal to P, which is the number of antenna port, or less than P.

TABLE 1

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 3 | 1 | $x^{(0)}(i) = d^{(0)}(3i)$<br>$x^{(1)}(i) = d^{(0)}(3i + 1)$<br>$x^{(2)}(i) = d^{(0)}(3i + 2)$ | $M_{symb}^{layer} = M_{symb}^{(0)}/3$ |
| 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M_{symb}^{layer} = M_{symb}^{(0)} = M_{symb}^{(1)}/2$ |
| 4 | 1 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$ | $M_{symb}^{layer} = M_{symb}^{(0)}/4$ |
| 4 | 2 | $x^{(0)}(i) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M_{symb}^{layer} = M_{symb}^{(0)}/2 = M_{symb}^{(1)}/2$ |
| 5 | 2 | $x^{(0)}(i) = d^{(0)}(2i)$<br>$x^{(1)}(i) = d^{(0)}(2i + 1)$<br>$x^{(2)}(i) = d^{(1)}(3i)$<br>$x^{(3)}(i) = d^{(1)}(3i + 1)$<br>$x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$<br>$x^{(5)}(i) = d^{(1)}(4i + 2)$<br>$x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$<br>$x^{(6)}(i) = d^{(1)}(4i + 2)$<br>$x^{(7)}(i) = d^{(1)}(4i + 3)$ | $M_{symb}^{layer} = M_{symb}^{(0)}/4 = M_{symb}^{(1)}/4$ |

Meanwhile, in case of transmitting a data in OFDM system using a multi antenna technique, the data may not transmitted to an identical space resource, i.e., a layer in all time-frequency resources.

Figure 8:
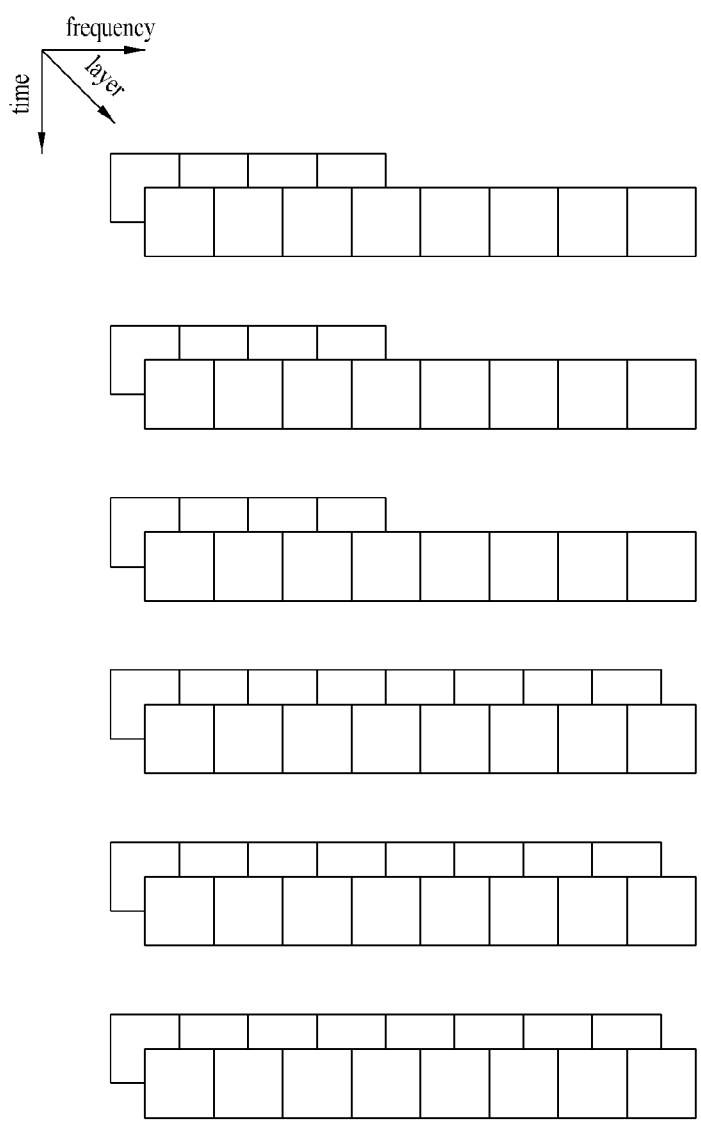
FIG. 8 is a diagram of an example of which a data is mapped to a space resource using a multi antenna technique.

FIG. 8 is a diagram of an example of which a data is mapped to a space resource using a multi antenna technique.

Referring to FIG. 8, a data is not transmitted in a specific layer of a part of time-frequency resource and can be transmitted in all layers of a remaining time-frequency resource.

For instance, in case that an eNode B transmits R-PDCCH, which is a relay node-specific control channel, to a relay node, the R-PDCCH is transmitted to the relay node by a rank 1 transmission due to a property of a control channel, i.e., in a manner of being mapped to a single layer and a data can be mapped to remaining layers. Hence, data is not transmitted in a specific layer of a part of the time-frequency resource due to the R-PDCCH and the data can be transmitted in all layers of the remaining time-frequency resource.

Yet, in case of using a conventional layer mapping method as shown in Table 1, if the number of data information mapped to a specific layer is different from the number of data mapped to a different layer, it may bring about an abnormal operation and the mapping method may cause a problem.

Hence, the present invention proposes a layer mapping method in case that the number of data information mapped to a specific layer is different from the number of data mapped to a different layer.

First Embodiment

The present invention proposes a method for mapping a data in an order of layer-frequency-time. In particular, when a data is mapped, if an unusable resource exists in a specific layer, the present invention proposes to continuously map the data in the order of layer-frequency-time except the corresponding specific layer.

In this case, mapping in the order of layer-frequency-time means to map data to a layer axis. If data is mapped to all layers, the data is mapped again to the layer axis in a manner of moving to a next frequency resource and so on. Hence, if the data is mapped to all layers-frequencies in a first OFDM symbol, an identical mapping method is applied to a next OFDM symbol.

FIG. 9 is a diagram of an example for a method of layer mapping according to a first embodiment of the present invention.

In particular, FIG. 9 (*a*) is a case that one code word is mapped to two layers and FIG. 9 (*b*) is a case that one codeword is mapped to three layers. FIG. 9 (*b*) shows an example that a specific resource of a layer #0 is not allocated to transmit a data.

The first embodiment of the present invention can be summarized as Table 2 as follows.

TABLE 2

Codeword-to-layer mapping $$i_x = 0, 1, \ldots, M_{symb}^{layer\ \#x} - 1, M_{symb}^{(0)} = \sum_{x=0}^{L-1} M_{symb}^{layer\ \#x}$$

| Number of layers | Number of codewords | | In case $x^{(0)}(i_0)$ correspond to non data resource |
|---|---|---|---|
| 2 | 1 | $x^{(0)}(i_0) = d^{(0)}(2i)$<br>$x^{(1)}(i_1) = d^{(0)}(2i+1)$ | $x^{(1)}(i_1) = d^{(0)}(i)$ |
| 3 | 1 | $x^{(0)}(i_0) = d^{(0)}(3i)$<br>$x^{(1)}(i_1) = d^{(0)}(3i+1)$<br>$x^{(2)}(i_2) = d^{(0)}(3i+2)$ | $x^{(1)}(i_1) = d^{(0)}(2i)$<br>$x^{(2)}(i_2) = d^{(0)}(2i+1)$ |
| 4 | 1 | $x^{(0)}(i_0) = d^{(0)}(4i)$<br>$x^{(1)}(i_1) = d^{(0)}(4i+1)$<br>$x^{(2)}(i_2) = d^{(0)}(4i+2)$<br>$x^{(3)}(i_3) = d^{(0)}(4i+3)$ | $x^{(1)}(i_1) = d^{(0)}(3i)$<br>$x^{(2)}(i_2) = d^{(0)}(3i+2)$<br>$x^{(3)}(i_3) = d^{(0)}(3i+3)$ |

Referring to Table 2, in general, a data can be mapped in the order of layer-frequency-time as shown in the left of Table 2. If a layer, which is a space resource for $x^{(0)}(i_0)$, is not allocated, it may use a mapping method shown in the right of Table 2. In particular, in case that the layer, which is the space resource for $x^{(0)}(i_0)$, is not allocated, data can be continuously mapped in the order of layer-frequency-time except the corresponding layer.

As a different method for implementing the first embodiment of the present invention, it may use a pseudo code algorithm shown in Table 3 as follows.

TABLE 3

Set i to 0, Set j to 0
While $j < M_{symb}^{(0)} = \sum_{x=0}^{L-1} M_{symb}^{layer-x}$
  For x = 0 to L-1
    If $x^{(x)}(i)$ is a valid data allocation resource
      $x^{(x)}(i) = d^{(0)}(j)$
      Increment j by 1
    Else
      $x^{(x)}(i) = <NULL>$
    End if
  End for
  Increment i by 1
End While
Prune out all values from $x^{(x)}(i)$ which are set to <NULL>.

As a different method, it may use a pseudo code algorithm shown in Table 4 as follows.

TABLE 4

Set $i_0$ to 0, $i_1$ to 0, ... $1_{L-1}$ to 0, Set j to 0
While $j < M_{symb}^{(0)} = \sum_{x=0}^{L-1} M_{symb}^{layer-x}$
  For x = 0 to L-1
    If $x^{(x)}(i_x)$ is a valid data allocation resource
      $x^{(x)}(i_x) = d^{(0)}(j)$
      Increment j by 1, Increment $i_x$ by 1
    End if
  End for
End While Second Embodiment In a second embodiment of the present invention, a sequential mapping is basically performed in an order of layer-frequency-time. If an unusable resource exists in a specific layer, the present invention proposes a method of mapping to a next logical time-frequency resource capable of being transmitted in terms of the corresponding layer. In particular, the method is to sequentially map a data in the order of layer-frequency-time in a corresponding arrangement while arranging available time-frequency resource according to each layer.

FIG. 10 is a diagram of an example for a method of layer mapping according to a second embodiment of the present invention. In particular, FIG. 10 (*a*) is a case that one codeword is mapped to two layers and FIG. 10 (*b*) is a case that one codeword is mapped to three layers. FIG. 10 (*b*) shows an example that a specific resource of a layer #0 is not allocated to transmit a data.

Referring to FIG. 10, in case of mapping a data to two layers, if a data mapping is preferentially performed to a layer domain and data is mapped to all layers in a corresponding time-frequency resource, mapping is performed in a manner of going to a next frequency and switching over the corresponding layers.

If a data can be transmitted by a single layer in a specific time-frequency resource, a first layer maps the data to an available next time-frequency resource and a different layer maps the data to the available next time-frequency resource in terms of the different layer. In particular, the mapping is always performed in a manner of switching over the layers.

And, if there is no specific layer to which data information can be mapped, the data can be mapped in the order of layer-frequency-time in a remaining layer.

The second embodiment of the present invention can be summarized as Table 5 as follows.

TABLE 5

Codeword-to-layer mapping $$i_x = 0, 1, \ldots, M_{symb}^{layer\ \#x} - 1, M_{symb}^{(0)} = \sum_{x=0}^{L-1} M_{symb}^{layer\ \#x}$$

| Number of layers | Number of codewords | | If i >= $N_T$, where $N_T$ is the partition of the resource in which the first layer has filled up all of its time/frequency resource. |
|---|---|---|---|
| 2 | 1 | $x^{(0)}(i_0) = d^{(0)}(2i)$ $x^{(1)}(i_1) = d^{(0)}(2i+1)$ | |
| 3 | 1 | $x^{(0)}(i_0) = d^{(0)}(3i)$ $x^{(1)}(i_1) = d^{(0)}(3i+1)$ $x^{(1)}(i_1) = d^{(0)}(3i+1)$ $x^{(2)}(i_2) = d^{(0)}(3i+2)$ $x^{(2)}(i_2) = d^{(0)}(3i+2)$ | |
| 4 | 1 | $x^{(0)}(i_0) = d^{(0)}(4i)$ $x^{(1)}(i_1) = d^{(0)}(4i+1)$ $x^{(1)}(i_1) = d^{(0)}(4i+1)$ $x^{(2)}(i_2) = d^{(0)}(4i+2)$ $x^{(2)}(i_2) = d^{(0)}(4i+2)$ $x^{(3)}(i_3) = d^{(0)}(4i+3)$ $x^{(3)}(i_3) = d^{(0)}(4i+3)$ | |

Referring to Table 5, in general, a data can be mapped in the order of layer-frequency-time as shown in the left of Table 5. If i is equal to $N_T$ or greater than $N_T$, it may use a mapping method shown in the right of Table 2. In this case, $N_T$ means a value of the number of time-frequency resource of layer #0 multiplied by the number of layer. For instance, it may be represented as $N_T = L \cdot M_{symb}^{layer\ \#0}$.

Third Embodiment

FIG. 11 is a diagram of an example for a method of layer mapping according to a third embodiment of the present invention. Yet, for clarity, FIG. 10 shows an example that one codeword is mapped to two layers only.

Referring to FIG. 11, unlike the second embodiment for rotationally filling a layer domain as much as possible, in case that there exists a time-frequency resource not capable of transmitting a data in a specific layer, while going to a next layer at which the corresponding time-frequency resource is positioned, if a mapping data is mapped to the specific layer, a next mapping should be mapped to the next layer. If there is no more time-frequency resource available for mapping in the specific layer, the third embodiment of the present invention proposes to continuously map except the corresponding layer with an identical method.

Meanwhile, the aforementioned embodiments can be applied according to a codeword in case that two or more codewords are transmitted. For instance, if there is a not allocated time-frequency resource in a specific layer and if a codeword mapped to the specific layer corresponds to one of a plurality of the codewords, the corresponding codeword can be implemented by the method proposed by the present invention and other codewords can be implemented in a manner of utilizing a common data mapping method.

In the aforementioned embodiments, assumed that a data is coded and a rate matching for the data is performed in accordance with a total quantity of resources capable of being practically transmitted. Yet, as mentioned earlier in the embodiments, although a part of the time-frequency resource of the layer #0 is not allocated to practically transmit a data, data coding and rate matching can be performed in accordance with available quantity of resource including the aforementioned part of the resource. In particular, a mapping can be performed under an assumption that the part of the resource is also allocated to transmit the data in a manner of assuming that all layers have identical numbers of time-frequency resource and performing a data coding and rate matching. It may consider not transmitting a data mapped to a resource not practically allocated, i.e., a time-frequency resource of a specific layer. This method can reduce implementation complexity without changing a layer mapping structure.

Figure 12:
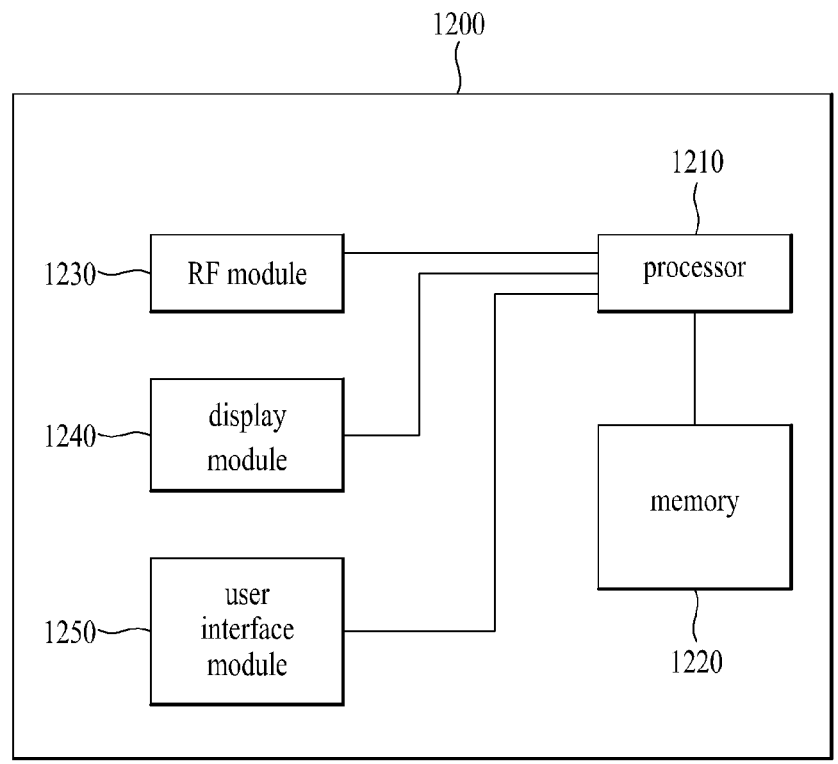
FIG. 12 is a block diagram of an example for a communication device according to one embodiment of the present invention.

FIG. 12 is a block diagram of an example for a communication device according to one embodiment of the present invention.

Referring to FIG. 12, a communication device 1200 may include a processor 1210, a memory 1220, an RF module 1230, a display module 1240, and a user interface module 1250.

Since the communication device 1200 is depicted for clarity of description, prescribed module(s) may be omitted in part. The communication device 1200 may further include necessary module(s). And, a prescribed module of the communication device 1200 may be divided into subdivided modules. A processor 1210 is configured to perform an operation according to the embodiments of the present invention illustrated with reference to drawings. In particular, the detailed operation of the processor 1210 may refer to the former contents described with reference to FIG. 1 to FIG. 11.

The memory 1220 is connected with the processor 1210 and stores an operating system, applications, program codes, data, and the like. The RF module 1230 is connected with the processor 1210 and then performs a function of converting a baseband signal to a radio signal or a function of converting a radio signal to a baseband signal. To this end, the RF module 1230 performs an analog conversion, amplification, a filtering, and a frequency up conversion, or performs processes inverse to the former processes. The display module 1240 is connected with the processor 1210 and displays various kinds of informations. And, the display module 1240 can be implemented using such a well-known component as an LCD (liquid crystal display), an LED (light emitting diode), an OLED (organic light emitting diode) display and the like, by which the present invention may be non-limited. The user interface module 1250 is connected with the processor 1210 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting a signal in a multi antenna wireless communication system and an apparatus therefor are described with reference to examples applied to 3GPP LTE system, it may be applicable to various kinds of wireless communication systems as well as the 3GPP LTE system.

What is claimed is:

1. A method for transmitting a data to a receiving end at a transmitting end in a multi antenna wireless communication system, the method comprising:
mapping a transmission resource allocated for the data to the data in an order of a space domain, a frequency domain, and a time domain; and
transmitting the data to the receiving end using the mapped transmission resource,
wherein the transmission resource comprises a plurality of space resources,
wherein each of a plurality of the space resources consists of a plurality of resource allocation units defined by a specific time resource and a specific frequency resource,
wherein when the resource allocation unit allocated to a specific space resource does not exist, the mapping step comprises mapping the data to a remaining space resource in an order of a frequency resource and a time resource.

2. The method according to claim 1, wherein the resource allocation unit corresponds to a complex-valued modulation symbol.

3. The method according to claim 1, wherein the data corresponds to one codeword coded in a complex-valued modulation symbol unit.

4. The method according to claim 1, wherein a plurality of the space resources comprise a plurality of layers.

5. The method according to claim 3, further comprising performing a rate matching for the codeword in accordance with a number of the resource allocation unit contained in the transmission resource.

6. The method according to claim 1, wherein the resource allocation unit not existing in the specific space resource corresponds to a transmission resource allocated for a control information.

7. A transmission device in a multi antenna wireless communication system, the transmission device comprising:
a processor configured to map a transmission resource allocated for a data to the data in an order of a space domain, a frequency domain, and a time domain; and
a transmission module configured to transmit the data to a receiving end using the mapped transmission resource,
wherein the transmission resource comprises a plurality of space resources,
wherein each of a plurality of the space resources consists of a plurality of resource allocation units defined by a specific time resource and a specific frequency resource,
wherein when the resource allocation unit allocated to a specific space resource does not exist, the processor is configured to map the data to a remaining space resource in an order of a frequency resource and a time resource.

8. The transmission device according to claim 7, wherein the resource allocation unit corresponds to a complex-valued modulation symbol.

9. The transmission device according to claim 7, wherein the data corresponds to one codeword coded in a complex-valued modulation symbol unit.

10. The transmission device according to claim 7, wherein a plurality of the space resources comprise a plurality of layers.

11. The transmission device according to claim 9, wherein the processor is configured to perform a rate matching for the codeword in accordance with a number of the resource allocation unit contained in the transmission resource.

12. The transmission device according to claim 7, wherein the resource allocation unit not existing in the specific space resource corresponds to a transmission resource allocated for a control information.

* * * * *